UNITED STATES PATENT OFFICE.

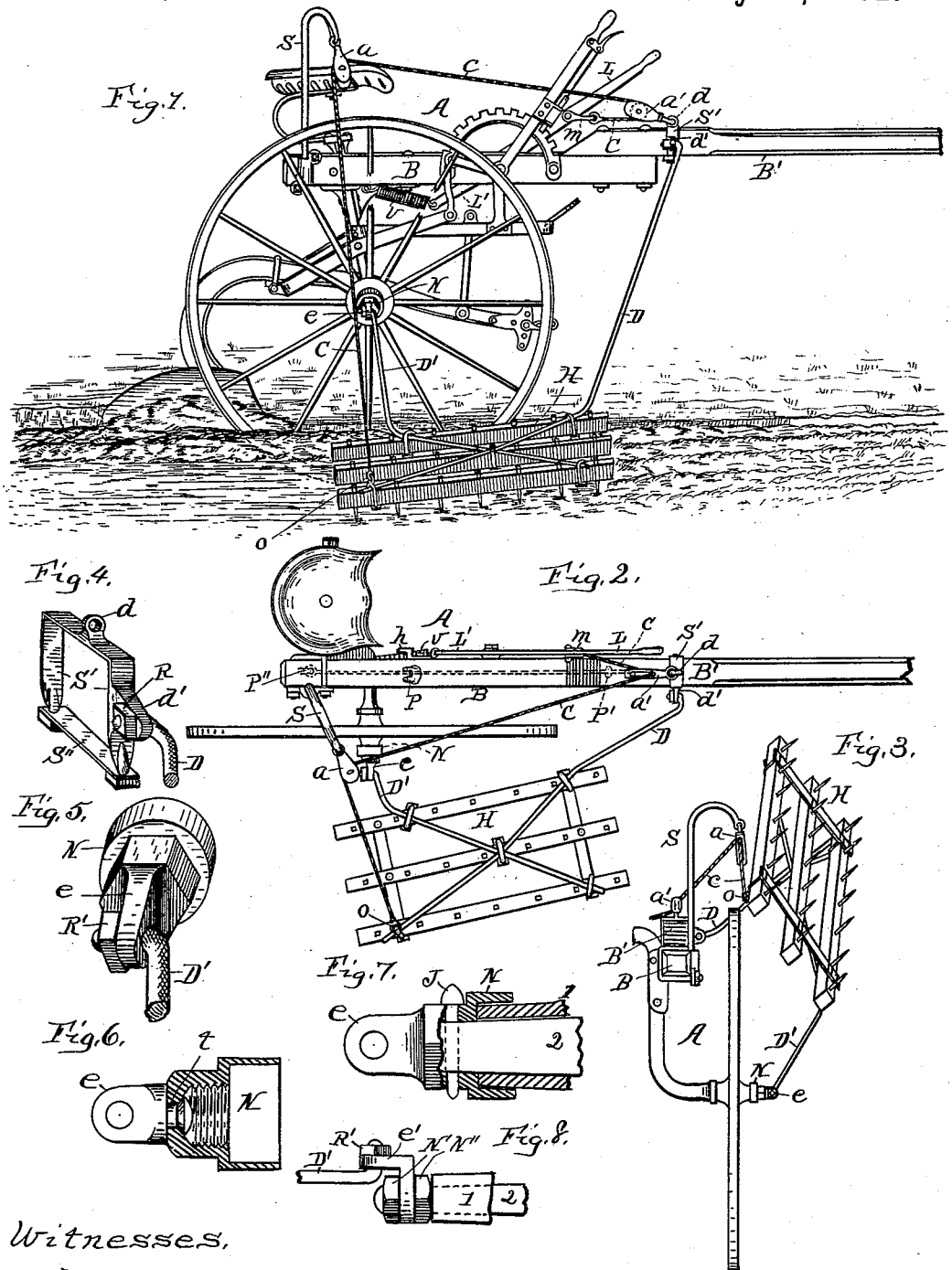

MICHAEL A. McCLELLAN, OF CHICAGO, ILLINOIS.

COMBINED SULKY PLOW AND HARROW.

SPECIFICATION forming part of Letters Patent No. 478,627, dated July 12, 1892.

Application filed January 13, 1891. Serial No. 377,592. (No model.)

*To all whom it may concern:*

Be it known that I, MICHAEL A. MCCLELLAN, a citizen of the United States of America, residing at Chicago, in the county of Cook and State of Illinois, have invented certain new and useful Improvements in a Combined Sulky Plow and Harrow, of which the following is a specification, reference being had therein to the accompanying drawings, and the letters and figures of reference thereon, forming a part of this specification, in which—

Figure 1 is a perspective elevation of my invention represented as in operation. Fig. 2 is a top plan of the same, showing but a portion of the plow mechanism. Fig. 3 is a rear elevation of the same, showing the harrow thereof raised off the ground. Fig. 4 is a detailed perspective of the clip for attaching the harrow mechanism to the forward portion of the plow. Fig. 5 is a similar view of the nut, which is designed to substitute the usual nut of a plow-spindle, and by means of which the harrow mechanism is attached to the said spindle. Fig. 6 is a longitudinal section of the said nut, showing the extending perforated lug thereof swiveled thereto. Fig. 7 is a detailed partial sectional view of a cap adapted to be held upon a spindle by means of a key, it being a substitute for the nut shown in Fig. 5; and Fig. 8 is a plan view of an angle-plate and a portion of a spindle and wheel-hub thereon, said plate being perforated and held upon the spindle in substitute of the nut by means of two nuts.

This invention relates to certain improvements in harrow attachments to sulky-plows or other like implements; and it consists in the particular construction of the harrow and the manner of attachment to the plow-frame and the means for raising and lowering the harrow when in service, which improvements are fully set forth and explained in the following specification, and pointed out in the claims.

The object of my invention is to so combine a plow and harrow that they may be operated and manipulated jointly by a single team and by a single person riding upon the plow, with the harrow operating at the side of the plow in such manner as to pulverize the soil which is thrown up and loosened by the action of the plow before the action of the sun and atmosphere has dried the lumps thereof.

Referring to the drawings, A represents a sulky-plow, which may be of any of the common constructions, and H is the harrow thereof, which is attached thereto in the following manner: The harrow H is provided with two metal arms D and D', which at their lower outer portion cross upon the harrow and are securely clipped thereto, as shown, and at their junction with the harrow curve upwardly and toward the plow, the arm D extending to the forward portion of the plow to a point at the side of the rear portion of the tongue, and the arm D' extending to a point adjacent the plow-spindle, and each of said arms are provided with a rearwardly-hooked portion or terminal, which portions are screw-threaded far enough to receive a nut.

To the tongue B' of the plow is secured a clip S', such as is shown in Fig. 4, which is provided with a usual clip-plate S'' and held by nuts turned on the clip-terminals, as shown, which clip is provided with a side extending perforated lug d', and the hooked portion of arm D of the harrow is placed in the perforation or hole thereof and held therein by means of a nut, as shown at R in Fig. 4, and thus the said arm is jointed to the plow.

N represents a nut made to turn onto the extending screw-threaded end of the plow-spindle in substitute of the usual nut for holding the wheel-hub, and is provided with an extending perforated lug e, either integral therewith or swiveled therewith, and the hooked portion of arm D' of the harrow is placed in the perforation or hole thereof and held therein by means of a nut, as shown at R' in Fig. 5, and thus said arm is likewise jointed to the plow. In Fig. 6 I have represented the swivel connection of said nut and perforated lug at t, and in Fig. 8 I have represented the lug portion at e' as being a part of an angle-plate, which is provided with a hole corresponding with the plow-spindle and sleeved upon the spindle and held between a pair of nuts N' N''; also, in Fig. 7 I have illustrated a sleeve or cap of the same pattern as nut N, but not screw-threaded, and is adapted to be held upon the spindle 2 to hold the wheel-hub 1 by means of a pin J.

The mechanism and manner of raising and lowering the harrow, thereby causing the arms D D' to turn at their joints, is as follows: To the rear portion of the beam B of the plow-frame I have provided and secured a standard S, which is curved at its upper portion to overreach the plow-wheel at the harrow side, and to the end portion thereof I have attached a pulley-block $a$, and to the upper portion of clip S', I have provided an upright perforated lug $d$, to which I have attached a second like pulley-block $a'$, and to the side of beam B, I have pivotally secured a hand-lever L, which is provided with a downwardly-extending portion L', the lower end of which is perforated and has attached thereto in its perforation a coil-spring $v$, which spring is attached at its opposite end to the plow-frame in such manner as to yieldingly hold the upper portion of the lever in a forward-inclined position, as shown in Figs. 1 and 2; also, to the lever L, I have attached a clevis $m$ a distance from its point of pivot, as also shown in Fig. 1, and to the outer rear portion of the harrow H, I have attached a rope or cable C, as shown at O, which rope or cable I pass up and about the pulley of block $a$, thence to and about the pulley of block $a'$, and thence to and secured to the clevis $m$ of lever L in such manner that when the harrow is down at work the slack will be practically taken up from the rope or cable, and when the lever is grasped and moved rearward it will draw the rope or cable with it, and thus raise the harrow off the ground in the manner shown in Fig. 3, and when the lever is thus moved rearward it may be held by placing it in the hook $h$, which is secured to beam B. By releasing the lever the weight of the harrow will cause it to lower and assume its proper working position.

If desired, the lever L may be dispensed with and the rope C brought to the rear portion of beam B and there attached, as shown at P'' in Fig. 1 by the dotted lines, and in such position it may be grasped by a person on the plow-seat and pulled upon to raise the harrow, and in such instances I have provided the rope with a fixed ring or ball, (shown by dotted lines at P',) and to the beam B, I have shown an attached forked standard P for the purpose of holding the ring or ball of the rope C to hold the harrow raised, as before described.

Having thus described my invention, what I claim as new and useful, and desire to secure by Letters Patent, is as follows:

1. In combination with a sulky-plow or similar implement, the harrow provided with the forward and rear side extending arms attached thereto, the clip provided with the side eye-lug for hinging the forward harrow-arm to the plow-frame, the hinge connection for connecting the rear harrow-arm to the plow-spindle, and the lever, pulley, and rope mechanism for raising and lowering the harrow, substantially as set forth.

2. In combination with a sulky-plow, the harrow attachment provided with a forward and a rear side extending arm, said arms being respectively hinged to the plow-frame and spindle, the lever and pulleys attached to the plow-frame, and the rope arranged about said pulleys and connecting said harrow and lever, substantially as and for the purpose set forth.

MICHAEL A. McCLELLAN.

Witnesses:
WM. J. HUTCHINS,
N. B. HAGIN.